United States Patent
Roychoudhury et al.

(10) Patent No.: US 10,876,472 B1
(45) Date of Patent: Dec. 29, 2020

(54) SPARK-IGNITED INTERNAL COMBUSTION ENGINE MODIFIED FOR MULTI-FUEL OPERATION

(71) Applicant: Precision Combustion, Inc., North Haven, CT (US)

(72) Inventors: Subir Roychoudhury, Madison, CT (US); Richard Mastanduno, Milford, CT (US); David Lang Spence, Beacon Falls, CT (US); Bruce Crowder, Hamden, CT (US); Curtis Morgan, Southington, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 123 days.

(21) Appl. No.: 16/015,305

(22) Filed: Jun. 22, 2018

Related U.S. Application Data

(62) Division of application No. 14/826,263, filed on Aug. 14, 2015, now Pat. No. 10,060,344.

(Continued)

(51) Int. Cl.
*F02B 51/02* (2006.01)
*F02B 69/02* (2006.01)
(Continued)

(52) U.S. Cl.
CPC .............. *F02B 69/02* (2013.01); *F02B 51/02* (2013.01); *F02B 63/04* (2013.01); *F02D 9/02* (2013.01); *F02D 41/0025* (2013.01); *F02G 5/00* (2013.01)

(58) Field of Classification Search
CPC ......... F02M 27/02; F02B 51/02; F02B 43/02; F02D 19/0671
See application file for complete search history.

(56) References Cited

U.S. PATENT DOCUMENTS

| 3,915,125 A | 10/1975 | Henkel |
| 3,982,910 A | 9/1976 | Houseman |

(Continued)

FOREIGN PATENT DOCUMENTS

| JP | 2005083210 A | 3/2005 |
| TW | 200848604 A | 12/2008 |

(Continued)

OTHER PUBLICATIONS

S. Brusca, V. Chiodo, A. Galvagno, R. Lanzafame, A. Marino Cugno Garrano, "Analysis of Reforming Gas Combustion in Internal Combustion Engine", Energy Procedia, 45 (2014), pp. 899-908; Proceedings of the 68th Conference of the Italian Thermal Machines Engineering Association, Bologna, Italy, Sep. 11-13, 2013.

(Continued)

*Primary Examiner* — George C Jin
*Assistant Examiner* — Teuta B Holbrook
(74) *Attorney, Agent, or Firm* — Marie F. Zuckerman; Andrew D. Gathy

(57) ABSTRACT

A spark-ignited (SI) internal combustion (IC) engine designed to operate on high octane fuels, such as gasoline, is reconfigured to operate on low octane fuels including logistically preferred distillate fuels, such as diesel or JP-8. Design modifications involve coupling a fuel reformer module to the internal combustion engine. Auxiliary components include a system control module, a heat exchange module, a bypass valve to facilitate start-up, and/or a throttle body to control a reformate-oxidizer mixture fed to the engine. Small portable generators having 0.3-3.0 kWe power output are disclosed based upon the modified SI-IC engine design.

16 Claims, 2 Drawing Sheets

Related U.S. Application Data

Figure 1:
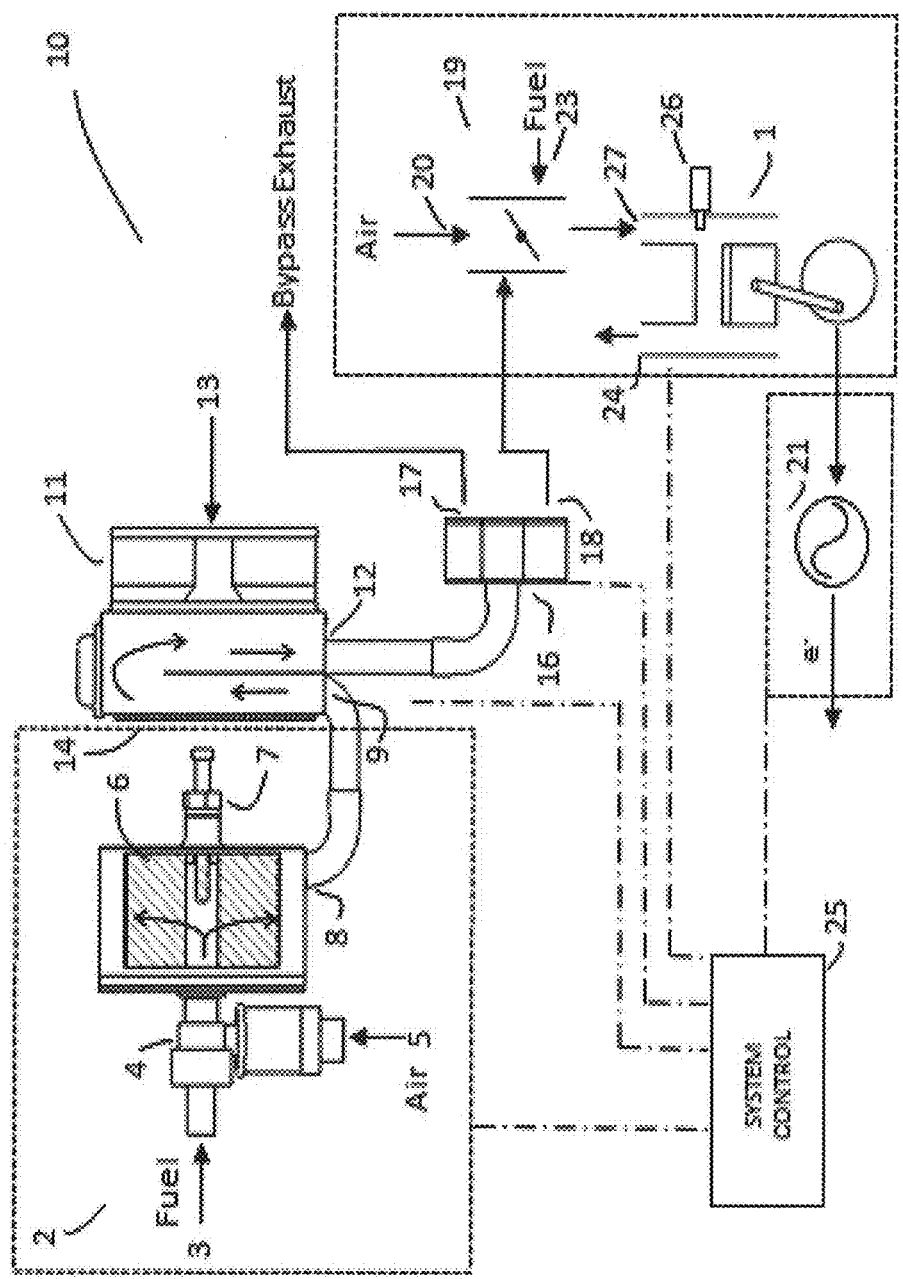

(60) Provisional application No. 62/070,237, filed on Aug. 18, 2014.

(51) Int. Cl.
  *F02G 5/00* (2006.01)
  *F02D 41/00* (2006.01)
  *F02D 9/02* (2006.01)
  *F02B 63/04* (2006.01)

(56) References Cited

U.S. PATENT DOCUMENTS

| | | | |
|---|---|---|---|
| 4,033,133 | A | 7/1977 | Houseman |
| 4,109,461 | A | 8/1978 | Fujitani |
| 4,131,086 | A | 12/1978 | Noguchi |
| 4,131,095 | A | 12/1978 | Ouchi |
| 4,350,133 | A | 9/1982 | Greiner |
| 5,051,241 | A | 9/1991 | Pfefferle |
| 5,623,412 | A * | 4/1997 | Masson ................ F02B 77/087 123/406.34 |
| 5,947,063 | A | 9/1999 | Smith |
| 6,156,444 | A | 12/2000 | Smith |
| 7,040,084 | B2 | 5/2006 | Ament |
| 7,174,861 | B2 | 2/2007 | Allston |
| 7,504,047 | B2 | 3/2009 | Castaldi |
| 7,976,594 | B2 | 7/2011 | Roychoudhury |
| 8,439,990 | B2 | 5/2013 | Roychoudhury |
| 8,557,189 | B2 | 10/2013 | Roychoudhury |
| 8,795,398 | B2 | 8/2014 | Roychoudhury |
| 10,001,278 | B1 * | 6/2018 | Roychoudhury ......... F23K 5/08 |
| 2004/0099226 | A1 | 5/2004 | Bromberg |
| 2004/0144337 | A1 | 7/2004 | Wakao |
| 2005/0058593 | A1 * | 3/2005 | Viola .................... B01J 8/0264 423/650 |
| 2007/0183939 | A1 | 8/2007 | Hotta |
| 2007/0227488 | A1 * | 10/2007 | Gotou ................... F02P 19/021 123/145 A |
| 2008/0010993 | A1 * | 1/2008 | Morgenstern .......... C01B 3/323 60/780 |
| 2008/0110419 | A1 | 5/2008 | Sakurai |
| 2008/0127553 | A1 | 6/2008 | Roychoudhury |
| 2009/0252661 | A1 | 10/2009 | Roychoudhury |
| 2010/0012090 | A1 | 1/2010 | Lewis, III |
| 2010/0126165 | A1 | 5/2010 | Roychoudhury |
| 2010/0174470 | A1 * | 7/2010 | Bromberg ............... F02B 17/00 701/103 |
| 2011/0079016 | A1 | 4/2011 | Etemad |
| 2011/0296759 | A1 * | 12/2011 | Roychoudhury ........ B01J 4/002 48/89 |
| 2013/0000275 | A1 * | 1/2013 | Scotto ................. F01N 3/2889 60/274 |
| 2013/0312384 | A1 | 11/2013 | Hwang |
| 2014/0109844 | A1 | 4/2014 | Wall |
| 2014/0109853 | A1 | 4/2014 | Gruber |

FOREIGN PATENT DOCUMENTS

| | | |
|---|---|---|
| WO | WO2004060546 A2 | 7/2004 |
| WO | WO2008054569 A2 | 5/2008 |
| WO | WO2012087343 A1 | 6/2012 |
| WO | WO2012141766 A1 | 10/2012 |
| WO | WO2013149112 A1 | 10/2013 |

OTHER PUBLICATIONS

F. Y. Hagos, A. R. A. Aziz, and S. A. Sulaiman, "Trends of Syngas as a Fuel in Internal Combustion Engines", Hindawi Publishing Corporation, Advances in Mechanical Engineering, vol. 2014, Article ID 401587, Jan. 30, 2014, 10 page.

S. Roychoudhury, D. Walsh, D. Chu, E. Kallio, "Performance of a Diesel, JP-8 Reformer", 2006 Fuel Cell Seminar, Honolulu, Hawaii, Nov. 13-17, 2006.

M. Castaldi, M. Lyubovsky, R. LaPierre, W. C. Pfefferle, and S. Roychoudhury, "Performance of Microlith Based Catalytic Reactors for an Isooctane Reforming System", SAE International, Publication No. 2003-01-1366, Mar. 3, 2003.

* cited by examiner

SPARK-IGNITED INTERNAL COMBUSTION ENGINE MODIFIED FOR MULTI-FUEL OPERATION

CROSS-REFERENCE TO RELATED APPLICATIONS

This application is a divisional of U.S. Non-provisional patent application Ser. No. 14/826,263, filed Aug. 14, 2015, which claims the benefit of U.S. Provisional Application No. 62/070,237, filed Aug. 18, 2014, the aforementioned applications in their entirety being incorporated herein by reference.

GOVERNMENT RIGHTS

This invention was made with support from the U.S. government under Contract no. W15P7T-08-C-K401, Contract no. W15P7T-12-C-A369, and Contract no. W15P7T-14-C-A451, sponsored by the Department of Defense (US Army). The U.S. Government holds certain rights in this invention.

FIELD OF THE INVENTION

The present invention pertains to an internal combustion engine adapted for multi-fuel operation. More specifically, this invention pertains to a spark-ignited internal combustion engine adapted with a fuel reformer for operation with a variety of reformed fuels. In another aspect, this invention pertains to a generator configured with a spark-ignited internal combustion engine in combination with a reformer. In yet another aspect, this invention pertains to a method of operating a spark-ignited internal combustion engine on a low octane fuel (e.g., diesel), in contrast to the high octane fuel (e.g., gasoline) for which the engine was originally designed.

BACKGROUND OF THE INVENTION

Internal combustion (IC) engines normally are designed to operate on a single energy-dense liquid fossil fuel, such as gasoline or diesel. Under typical conditions, in a first step the designated liquid fuel is injected into a chamber comprising a reciprocating piston. The fuel is mixed with an oxidizer, typically oxygen supplied as air. In a second step, the piston moves to compress the mixture. In a third step, the compressed mixture is either spark ignited (SI) or compression ignited (CI) depending upon the liquid fuel employed, whereupon combustion occurs to produce an expanding mixture of gaseous combustion products. The gaseous products produce a force on the piston, which moves the piston over a distance. Mechanical energy derived from the moving piston is converted into useful mechanical or electrical work. After maximum expansion, the piston retracts as the gases exit the chamber; and thereafter the process is repeated many times.

In one type of IC engine combustion is intermittent, as exemplified in familiar two-stroke and four stroke engines. Such engines find utility in motive applications and are the predominant power supply for cars, motorcycles, boats and small gasoline-powered engines, such as lawn mowers. Such engines also find utility in electrical power generators, which are useful, for example, in logistics and rescue operations (i.e., field operations) and for temporary power generation during disruptions in a power grid. Small portable generators of about 1 to 3 kilowatts electric (1-3 kWe) output are especially useful in logistics and rescue operations. In another type of IC engine, combustion is continuous. Such engines find utility in large-scale stationary power applications, such as gas turbine power plants, and larger more powerful motive applications, such as jet engines and rocket engines. The present invention is particularly directed to the intermittent IC engine and its use in mobile and stationary applications of a smaller, more portable scale as noted above.

Spark-ignited internal combustion (SI-IC) engines are designed for operation on a high octane fuel having an octane number typically greater than 80, for example, gasoline. For power generation under logistics and field conditions, gasoline is currently considered an undesirable fuel. For one reason, gasoline has a higher volatility and lower flash point as compared with lower octane liquid distillate fuels, such as JP-8 and diesel. Thus, providing a supply train for gasoline is more problematical than providing a supply train for distillate fuels. Moreover, providing multiple fuel trains is undesirable. Accordingly, it would be desirable to operate all power generation sources, both stationary and motive including those under field conditions, on one fuel, namely, a distillate fuel such as diesel or JP-8. As is well understood in the art, a spark-ignited gasoline engine is not designed for operation on a low octane distillate fuel.

Distillate fuels, such as JP-8, have a low octane number; for example, diesel has an octane number between about 15 and 25. Engines designed for operation on low octane fuel employ compression ignition (CI) and typically are large, heavy, and thick-walled to withstand compression pressures. Additionally, combustion of distillate fuels, such as diesel, generates soot and other unacceptable emissions. Operation of a diesel engine at reduced power is quite inefficient resulting in a condition called "wet stacking", a term used to describe deposition of unburned fuel inside the diesel engine exhaust system. An engine running in this condition generates considerable soot that without frequent cleaning can lead to catastrophic failure of the engine. Thus, the CI internal combustion engine operating on diesel fuel is not a suitable engine for logistics operations where small, lightweight, lower power (e.g., 0.3-3.0 kWe) features are needed. In view of the above, it would be desirable to redesign a SI internal combustion engine, originally designed for operation on a high octane fuel like gasoline, to operate on a low octane fuel, such as diesel or JP-8.

In one application, lightweight portable generator sets (hereinafter "gensets"), which produce about 1-3 kWe power, are commercially ubiquitous; however, these gensets employ a SI internal combustion engine and operate solely on high octane gasoline. Adapting these gensets to operate on low octane diesel or JP-8 would significantly alter power dynamics and offer advantages under field conditions.

U.S. Pat. No. 4,131,095 discloses an internal combustion engine operating on a reformed gas produced through reformation of "an ordinary liquid fuel typified by gasoline." The internal combustion engine is disclosed to comprise four combustion chambers, wherein the first combustion chamber is constructed to act as a reformer to convert the ordinary liquid fuel into a mixture of hydrogen and carbon monoxide and wherein the three remaining chambers are constructed to receive reformate and the ordinary liquid fuel. The engine is taught to operate solely on gasoline reformate, solely on liquid gasoline, or on a mixture of reformate and liquid gasoline.

U.S. Pat. No. 7,174,861 discloses a combined gasoline and hydrogen fueling system for gasoline-powered internal combustion engines, including a catalytic reformer for producing gaseous reformate from gasoline. The patent teaches that the reformate from the reformer is swept by air into the intake manifold of the cold engine, where it is mixed with intake air and then drawn into the cylinders and ignited conventionally to start the engine before the engine is transitioned to operation on gasoline.

Among other references disclosing the adaptation of an internal combustion engine with a fuel reformer are U.S. Pat. No. 4,033,133, and US 2014/0109844, and the following non-patent literature publications: F. Y. Hagos, A. R. A. Aziz, and S. A. Sulaiman, "Trends of Syngas as a Fuel in Internal Combustion Engines", Advances in Mechanical Engineering, Hindawi Publishing Corporation, Vol. 2014 (2014), Article ID 401587, 10 pp.; and S. Brusca, V. Chido, A. Galvagno, R. Lanzafame, and A. M. C. Garrano, "Analysis of Reforming Gas Combustion in Internal Combustion Engine", Energy Procedia, 45 (2014), 899-908.

Some prior art related to modifying an internal combustion engine with a fuel reformer tends not to disclose details of the fuel reformer or discloses inherently large, bulky reformer apparatuses. These reformers can exhibit unacceptable efficiency and can produce coke and degradation in hydrogen yield within a short time frame, rendering such apparatuses unacceptable for onboard motive or portable stationary applications. Other prior art attempts to achieve distillate fueling of an IC engine through distillate fuel vaporization, which does not actually change the fuel's low octane number and thus does not overcome the low octane issue. This latter approach suffers from durability and reliability issues inherent to vaporization in field use.

In view of the above, the intermittent spark-ignited internal combustion engine designed to operate on high octane fuel, such as gasoline, would benefit from design modifications that allow for multi-fuel operation. Such modifications should desirably involve no substantive redesign or reconfiguration of the spark-ignited internal combustion engine itself. Rather, the SI internal combustion engine should be simply retrofit with additional components that provide the desired novel functionality. It would be beneficial for a gasoline-fueled SI internal combustion engine to operate fully on a low octane distillate fuel, namely diesel or JP-8, so as to simplify fuel supply trains and to provide lightweight, portable engines and generators, preferably of 0.3 to 3.0 kWe output, suitable for a variety of logistics and field operations. Such modifications should desirably result in a spark-ignited internal combustion engine that meets existing emissions standards.

SUMMARY OF THE INVENTION

We have now discovered that an apparatus of the present invention provides a unique solution to the aforementioned problems in the prior art. Accordingly, in one aspect this invention provides for a spark-ignited internal combustion engine configured for multi-fuel operation, comprising:
 (a) a reformer module comprising:
  (i) a fuel inlet,
  (ii) an oxidizer inlet,
  (iii) a mixing zone fluidly coupled to the fuel inlet and oxidizer inlet,
  (iv) a catalytic reaction zone fluidly coupled to the mixing zone, the reaction zone comprising a mesh or foam substrate having an ultra-short-channel-length, the mesh or foam substrate having supported thereon a reforming catalyst;
  (v) an ignition source disposed within the catalytic reaction zone; and
  (vi) an outlet line fluidly coupled to the catalytic reaction zone; and
 (b) an internal combustion engine comprising:
  (i) one or more combustion chambers, each combustion chamber comprising a reciprocating piston and a spark igniter;
  (ii) a reformate intake, fluidly coupled to the outlet line of the reformer module and fluidly coupled to each combustion chamber;
  (iii) an oxidizer intake fluidly coupled to each combustion chamber; and
  (iv) an exhaust outlet fluidly coupled to each combustion chamber.

In one embodiment, the mesh or foam substrate having an ultra-short-channel-length is provided in a coiled configuration having an inner diameter and an outer diameter and a radial flow path from the inner diameter to the outer diameter. In another embodiment, the mesh or foam substrate having an ultra-short-channel-length is provided as a planar sheet or a stack of planar sheets.

In yet another embodiment, the reformer module and the internal combustion engine are coupled to a system control module comprising a plurality of individual components and/or modules so as to provide for distributed functionality. Specifically, the system control module comprises (i) a supplementary power source, such as a battery pack, which provides for start-up, peaking, and stabilization of the combined reformer-internal combustion engine system during operation; (ii) a data acquisition module, which comprises a plurality of sensors, including temperature, oxygen, pressure, and/or other sensors; and (iii) a processing module, which comprises computer hardware and software designed to receive data from the data acquisition module and calculate therefrom an integrated and controlled operation of the reformer with the internal combustion engine. Additionally, the control system may contain other balance of plant components, such as a fuel pump and one or more blowers.

In yet another embodiment, a heat exchange module is disposed between the reformer module and the internal combustion engine. The heat exchanger module functions to reduce the temperature of the reformate exiting the fuel reformer module prior to entering the internal combustion engine.

In yet another embodiment, a bypass valve is disposed between the reformer module (preferably after the heat exchanger module where such is present) and the internal combustion engine. As described hereinafter, the bypass valve functions to control start-up of the apparatus of this invention.

In yet another embodiment, the exhaust outlet from the internal combustion engine is fluidly coupled to the oxidizer inlet to the reformer. This embodiment is referred to as "exhaust gas recycle" or "EGR" and provides for a portion of the combustion exhaust gas to be recycled to the fuel reformer in conjunction with the oxidizer and the liquid fuel.

In yet another aspect, this invention provides for a method of operating a spark-ignited internal combustion engine on a low octane fuel, such as diesel or JP-8, wherein the spark-ignited internal combustion engine was originally designed for operation on a high octane fuel, such as gasoline. The method comprises:
 (a) contacting a low octane fuel and an oxidizer in a catalytic reaction zone of a reformer module, the catalytic reaction zone comprising a mesh or foam substrate having an ultra-short-channel-length, the substrate having supported thereon a reforming catalyst, the contacting being conducted under partial oxidation reaction conditions sufficient to convert the low octane fuel into a reformate comprising hydrogen and carbon monoxide;

(b) feeding the reformate into a heat exchange module wherein the reformate is in thermal conductive contact with a heat transfer fluid so as to cool the reformate; and (c) feeding the cooled reformate and an oxidizer into a spark-ignited internal combustion engine for combustion.

In a related embodiment of this method, a low octane liquid distillate fuel is co-fed with the reformate to the internal combustion engine. In this embodiment, the reformate comprises from about 20 percent to less than 100 percent of the total fuel fed to the engine; whereas the low octane fuel comprises from greater than 0 percent to about 80 percent of the total fuel fed to the engine.

The apparatus and method of this invention provide for a spark-ignited internal combustion engine, designed originally for operation on a high octane liquid fuel, to be adapted for multi-fuel operation including operation on a variety of low octane distillate fuels. No significant reconfiguration of the internal combustion engine is required. Rather, the engine is retrofitted with portable on-board components including a portable onboard fuel reformer, which converts low octane distillate fuel via partial oxidation into high octane gaseous reformate having an octane number approaching 100, which is fed essentially directly to the fuel intake of the SI internal combustion engine. The simplicity of the technology makes it readily adaptable to spark-ignited internal combustion engines commercially available from well-known engine manufacturers. In a preferred embodiment, the fuel reformer employed in this invention comprising the ultra-short-channel-length catalytic converter provides advantageously for quick start-up from cold conditions, high hydrogen yield, low coke precursors, and acceptable catalyst lifetime.

The internal combustion engine adapted in accordance with this invention can be used in transportation applications, such as automobiles, boats, and motorcycles; or alternatively coupled with an electrical converter for use as a generator. Generators producing from about 0.3 to 3.0 kilowatts electric (0.3-3.0 kWe) or higher output are obtainable from the apparatus described herein. This invention is particularly suited for field conditions wherein a spark-ignited internal combustion engine, originally configured to operate on high octane gasoline, is operated solely on reformate derived from low octane distillate fuel or on a mixture of said reformate and low octane liquid distillate fuel.

Hydrogen-fueled vehicles and generators are of interest as low-emissions apparatuses, because hydrogen as a fuel or fuel additive can significantly reduce production of undesirable emissions. Accordingly, the apparatus and method associated with this invention provide for onboard production of syngas comprising hydrogen, which when fed into a spark-ignited internal combustion engine drives combustion towards reduced emissions as well as higher engine efficiency.

DRAWINGS

FIG. 1 illustrates a schematic diagram of an embodiment of the apparatus of this invention comprising a spark-ignited internal combustion engine adapted with a fuel reformer.

Figure 2:
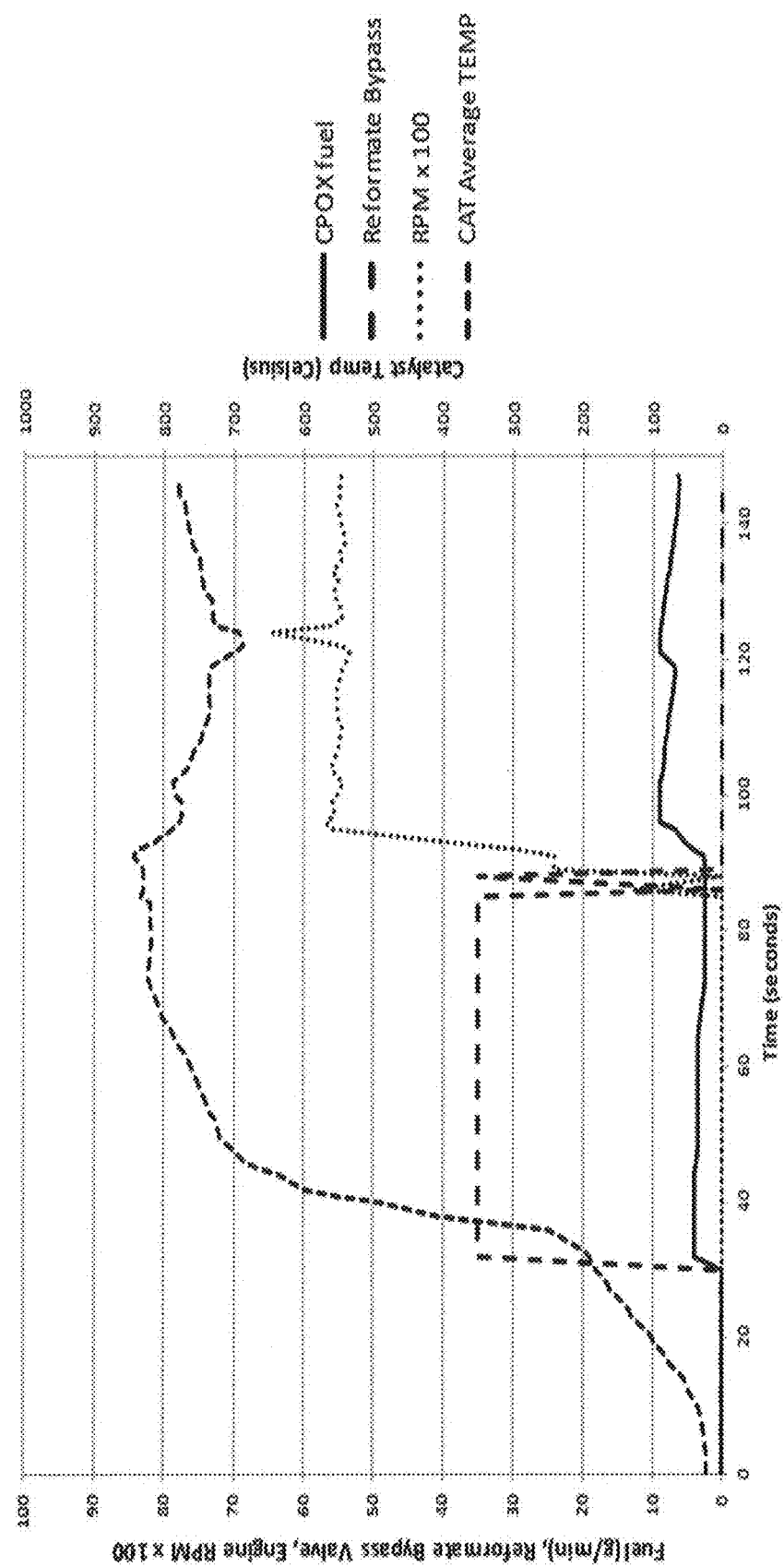

FIG. 2 provides a graph of input and output data obtained from operating a spark-ignited internal combustion engine on a low octane liquid hydrocarbon fuel, in accordance with the apparatus and method of this invention.

DETAILED DESCRIPTION OF THE INVENTION

In another embodiment this invention provides for a spark-ignited internal combustion engine adapted for multi-fuel operation comprising:

(a) a reformer module comprising:
(i) a fuel inlet;
(ii) an oxidizer inlet,
(iii) a mixing zone fluidly coupled to the fuel inlet and the oxidizer inlet,
(iv) a catalytic reaction zone fluidly coupled to the mixing zone, the reaction zone comprising a mesh or foam substrate having an ultra-short-channel-length, the mesh or foam substrate having supported thereon a reforming catalyst;
(v) an ignition source disposed within the catalytic reaction zone; and
(vi) an outlet line fluidly coupled to the catalytic reaction zone;

(b) a throttle body comprising:
(i) a housing having a throttle valve disposed therein;
(ii) upstream of the throttle valve, a reformate intake fluidly coupled to the outlet line (a)(vi) of the reformer module;
(iii) upstream of the throttle valve, an oxidizer intake; and
(iv) downstream of the throttle valve, an outlet for exiting a mixture of reformate and oxidizer; and (c) an internal combustion engine comprising:
(i) one or more combustion chambers, each combustion chamber comprising a reciprocating piston and a spark igniter;
(ii) a reformate-oxidizer intake fluidly coupled to the outlet (b)(iv) of the throttle body and further coupled to each combustion chamber; and
(iii) an exhaust from each combustion chamber.

In yet another embodiment, the throttle body further comprises a liquid fuel inlet downstream of the throttle valve for the purpose of providing an intake of liquid fuel (co-fuel) to the internal combustion engine.

In another embodiment, the internal combustion engine comprising the throttle body further comprises (d) a system control module operatively coupled to the reformer module and the internal combustion engine, and may or may not be coupled to the throttle body, as desired. The system control module comprises: (i) a supplementary power source; (ii) a data acquisition module; and (iii) a processing module, as described hereinbefore.

In yet another aspect, any one of the aforementioned embodiments of the internal combustion engine further comprises an electrical conversion module coupled to the internal combustion engine for converting mechanical output of the internal combustion engine into electricity. This aspect of the invention is recognized as a "generator".

In a preferred embodiment, the invention provides for a spark-ignited internal combustion engine adapted for multi-fuel operation comprising:

(a) a reformer module comprising:
(i) a fuel inlet;
(ii) an oxidizer inlet,
(iii) a mixing zone fluidly coupled to the fuel inlet and the oxidizer inlet, (iv) a catalytic reaction zone fluidly coupled to the mixing zone, the reaction zone comprising a mesh or foam substrate having an ultra-short-channel-length, the mesh or foam substrate having supported thereon a reforming catalyst;

(v) an ignition source disposed within the catalytic reaction zone; and (vi) an outlet line fluidly coupled to the catalytic reaction zone;

(b) a heat exchange module comprising (i) a first heat exchange inlet fluidly coupled to the outlet line of the reformer module, and a first flow path through the heat exchange module from the first heat exchange inlet to a first heat exchange outlet;

(ii) a second heat exchange inlet, and a second flow path through the heat exchange module from the second heat exchange inlet to a second heat exchange outlet; and (iii) the first flow path being in thermally conductive contact with the second flow path;

(c) a bypass valve comprising:

(i) a bypass inlet fluidly coupled to the first outlet of the heat exchange module;

(ii) a bypass first outlet to the environment; and (iii) a bypass second outlet;

(d) a throttle body comprising:

(i) a housing having a throttle valve disposed therein;

(ii) upstream of the throttle valve, a reformate intake fluidly coupled to the bypass second outlet;

(iii) upstream of the throttle valve, an oxidizer intake; and (iv) downstream of the throttle valve, an outlet for exiting a mixture of reformate and oxidizer; and (e) an internal combustion engine comprising:

(i) one or more combustion chambers, each combustion chamber comprising a reciprocating piston and a spark igniter;

(ii) a reformate-oxidizer intake fluidly coupled to the outlet of the throttle body and further coupled to each combustion chamber;

(iii) an exhaust outlet from each combustion chamber; and (f) a system control module operatively coupled to the reformer module, the heat exchange module, the bypass valve, and the spark-ignited internal combustion engine.

In yet another preferred aspect, the aforementioned internal combustion engine comprising the reformer, heat exchanger, bypass valve, throttle body, and spark-ignited engine further comprises an electrical conversion module coupled to the internal combustion engine for converting mechanical output of the engine into electricity. This aspect of the invention is recognized as a "generator".

With reference to FIG. 1, an embodiment of an apparatus of this invention is illustrated comprising an internal combustion engine configured with a catalytic fuel reformer. Apparatus 10 is shown comprising internal combustion engine 1 with spark igniter 26 and catalytic reformer module 2, the latter comprising fuel inlet 3, oxidizer inlet 5, mixer 4, catalytic reaction zone 6, ignition source 7, and reformer outlet 8. The fuel inlet 3 receives and inputs the liquid fuel into fluidly coupled mixer 4. Likewise, oxidizer inlet 5 receives and inputs an oxidizer into fluidly coupled mixer 4, the mixer providing for essentially complete atomization of the liquid fuel and thorough mixing thereof with the oxidizer. Mixer 4 communicates with the catalytic reaction zone 6 comprising a substrate having a reforming catalyst supported thereon. The substrate comprises a mesh or foam having an ultra-short-channel-length, as described hereinafter; in this specific embodiment a reticulated mesh provided in a coiled configuration having an inner diameter and an outer diameter so as to provide a radial flow path from the inner diameter to the outer diameter. The ignition source 7 is disposed within substrate 6 for the purpose of igniting a catalytic partial oxidation of the liquid fuel with the oxidizer to produce partial oxidation products (gaseous reformate), namely, a syngas mixture of hydrogen and carbon monoxide. Outlet line 8 communicating with the catalytic reaction zone 6 exhausts the gaseous reformate from reformer 2.

Continuing with FIG. 1, heat exchange module 11 is configured with a first inlet 9 for receiving the gaseous reformate from outlet line 8 of catalytic reformer 2. Heat exchange module 11 is further configured with a first flow path (shown as arrows) there through and a first outlet 12 for exiting the gaseous reformate from module 11. Heat exchange module 11 is further configured with a second inlet 13 for receiving a heat transfer fluid (or cooling fluid), a second flow path there through (not explicitly shown), and a second outlet 14 for exiting the heat transfer fluid. In the embodiment shown, the heat transfer fluid is exhausted to the environment; however, other configurations are possible. For example, when the heat transfer fluid is air, second outlet 14 can be fluidly connected to the oxidizer inlet 5 to the reformer 2, such that the oxidizer is preheated in the heat exchange module 11 prior to feeding to the reformer. The first and second flow paths are configured to be in thermal conductive contact (not shown in FIG. 1), such that heat in the gaseous reformate is conducted into the heat transfer fluid thereby cooling the gaseous reformate and heating the heat transfer fluid. The cooled gaseous reformate exits the heat exchange module at outlet 12.

In the embodiment shown in FIG. 1, bypass valve 16 is disposed between heat exchange module 11 and throttle valve 19. Outlet line 12 of heat exchange module 11 communicates with an inlet into bypass valve 16, allowing for a flow of reformate exiting heat exchange module 11 to enter bypass valve 16, which further comprises first bypass outlet 17 and second bypass outlet 18. First bypass outlet 17 exits the gaseous reformate to the environment. Second bypass outlet 18 exits the gaseous reformate to the internal combustion engine 1 via throttle body 19. In FIG. 1, second bypass outlet 18 communicates with throttle body 19, such that reformate exiting second bypass outlet 18 is fed into throttle body 19, which also receives oxidizer via inlet 20. An optional co-feed of liquid fuel (co-fuel) can be input into the engine via fuel inlet 23 disposed on the downstream end of the throttle body 19. The mixture of reformate and oxidizer, with or without co-fuel, is fed from the throttle body 19 into one or more reciprocating pistons of internal combustion engine 1 configured with spark igniter (spark plug) 26. The combustion chamber of the engine includes reformate/fuel-oxidizer intake 27, exhaust outlet 24 for exiting combustion products to the environment. Mechanical energy obtained from the internal combustion engine can be employed as mechanical work; or alternatively, as shown in FIG. 1 can be converted in generator 21 into electrical energy. System control module 25, coupled to the internal combustion engine 1, the reformer module 2, heat exchange module 11, and bypass valve 16, functions to integrate data outputs with process inputs for control of the process.

The fuel supplied to the reformer can be any gaseous or liquid hydrocarbon fuel; but for purposes of the method of this invention comprises any liquid distillate fuel derived from petroleum fossil fuel, biomass, or synthetic fuel sources. Normally, the distillate fuel is found in a liquid state within a temperature range from about −45° C. to about +140° C. at 1 atmosphere pressure. The boiling point or distillation point is fuel specific, but may range from about 160° C. to about 350° C. The fuel may consist of a single hydrocarbon component. More typically, the fuel comprises a complex mixture of paraffinic, cycloaliphatic, and aromatic hydrocarbons as known in the art. Suitable distillate fuels supplied to the reformer include distillate fuels having a low octane rating of less than about 30, preferably, between about 15 and 25, non-limiting examples of which include diesel, kerosene, JP-8, JP-10, and Jet-A, as well as biodiesel, and liquid hydrocarbon fuels obtained from synthetic sources including Fisher-Tropsch processes. For the purposes of this invention, the distillate fuel does not include high octane fuels having an octane rating higher than 80, such as gasoline.

The oxidizer supplied to the reformer comprises any chemical capable of partially oxidizing the distillate fuel selectively to a mixture of hydrogen and carbon monoxide (syngas). Suitable oxidizers include, without limitation, essentially pure oxygen, mixtures of oxygen and nitrogen, such as air, and mixtures of oxygen and one or more inert gases, such helium and argon. In most applications, air is the commercially desirable oxidizer.

The distillate fuel and oxidizer are provided to the reformer in a "fuel-rich" ratio such that there is insufficient amount of oxidizer to convert all of the fuel to deep oxidation products, namely, carbon dioxide and water. The quantities of distillate fuel and oxidizer are best described in terms of an O:C ratio, wherein "O" refers to atoms of oxygen in the oxidizer and "C" refers to atoms of carbon in the distillate fuel. Generally, the O:C ratio of oxidizer to distillate fuel fed to the reformer is greater than about 0.5:1 and less than about 1.1:1, the precise range being dependent upon the distillate fuel employed.

The reforming process desirably involves reforming wherein the distillate fuel and oxidizer are contacted in the absence of co-fed external water and/or steam. In this instance, the term "external water and/or steam" refers to a supply of water, or a supply of steam, or a supply of water and steam that is imported from an external source, e.g., water tank or steam generator or vaporizer carried onboard. While this application does not prohibit co-feeding water and/or steam to the reforming process, and while reformate yields are often enhanced by the addition of co-fed water or steam, in the present application co-feeding external water and/or steam might present certain disadvantages. For one, carrying a supply tank of water and/or a water vaporizer or steam generator onboard would be burdensome or impractical in logistical and field operations. Also, the volume and heat content of steam output in the reformate might induce a less than optimal operation of the downstream internal combustion engine. On the other hand, recycling to the reformer a portion of the IC engine exhaust gas containing steam is permissible and may be beneficial. Consequently, although we do not prohibit co-feeding water and/or steam where under certain circumstances it might be desirable for boosting hydrogen yield, the invention benefits from reforming in the absence of co-fed external water and/or steam. In other words, no water tank or steam generator or vaporizer is required.

The reformer module comprises a reformer of the type described in any of the following patent publications: U.S. Pat. Nos. 7,976,594; 8,557,189; WO 2004/060546; and US 2011/0061299, incorporated herein by reference. While the invention is described herein in terms of employing only one reformer module per combustion engine, another embodiment of the invention provides for a plurality of reformer modules, for example, two or more, to be integrated with one combustion engine. In most applications, one reformer module should satisfy the reformate requirements of the engine.

According to the invention, the distillate fuel is fed from a fuel tank through the fuel inlet into the reformer, specifically into the mixer unit. A fuel pump provides a suitable means for transporting the fuel from the fuel tank to the inlet of the reformer. The fuel inlet comprises any known device for feeding a liquid fuel, for example, a nozzle, atomizer, vaporizer, injector, mass flow meter, or any other suitable flow control device. The injector can also be used to quantify (or meter) the fuel fed to the reformer. Likewise, the oxidizer is fed into the mixer through the oxidizer inlet, which comprises any conventional inlet device, for example, a nozzle, injector, or mass flow meter.

The mixer may or may not comprise swirler vanes and baffles to facilitate atomization and mixing of the liquid fuel and oxidizer. One preferred mixer embodiment comprises combining a pulsed electromagnetic liquid fuel injector and a pulsed oxidizer injector, which feed fuel and oxidizer respectively, into an atomizer that thoroughly atomizes the liquid fuel and mixes it with the oxidizer. This combined dual injector-atomizer device is described in U.S. Pat. No. 8,439,990, incorporated herein by reference.

In one embodiment, the distillate fuel is fed to the mixer at ambient temperature without preheating. In another embodiment, the distillate fuel is preheated prior to being fed to the mixer. The oxidizer is generally fed into the mixer at the same temperature as the liquid fuel, but may be fed at a temperature hotter or colder as desired. In one embodiment, the oxidizer is fed to the mixer at ambient temperature. In another embodiment, the oxidizer is fed as the heat exchange fluid into the second flow path of the heat exchange module, where it is preheated prior to being fed into the reformer. We have found that heat generated in the catalytic reaction zone is sufficient to support fuel vaporization at a level required for stable partial oxidation throughout the catalyst bed. As a consequence, the reformer module and reforming process of the present invention provide gasification of liquid fuel without a requirement for supplying external heat or steam to the reformer.

The catalytic reaction zone of the reformer module comprises a mesh or foam substrate disposed therein onto which a catalyst is supported, such substrate configured to provide thorough mixing of the fuel and oxidizer passing there through. Generally, the substrate comprises a mesh or foam comprising a plurality of pores or channels of ultra-short-channel-length, as noted hereinafter. The mesh, for example, may consist of a reticulated metal net or screen with a plurality of pores. The foam, for example, may consist of a solid monolith containing a plurality of channels. In one embodiment the mesh substrate is suitably provided in a coiled configuration of cylindrical shape having an inner diameter and a larger outer diameter, such that reactants flowing there through move along a radial flow path from an inlet at the inner diameter to an outlet at the outer diameter. In another embodiment the mesh substrate is suitably provided as a sheet or a stack of sheets. The mesh provided in the coiled configuration or stack of sheets provides for a plurality of void volumes in random order, that is, empty spaces with essentially no regularity along the flow path from inlet to outlet. The substrate material of construction comprises any metal capable of withstanding the temperature at which the reformer module operates. Suitable materials include without limitation nickel-chrome-iron alloys of acceptable temperature durability.

In a preferred embodiment, the substrate comprises a Microlith brand ultra-short-channel-length metal mesh, available from Precision Combustion, Inc., North Haven, Conn., USA. A description of the ultra-short-channel-length metal mesh is found, for example, in U.S. Pat. No. 5,051,241, incorporated herein by reference. Generally, the mesh comprises short channel length, low thermal mass metal monoliths, which contrast with prior art monoliths having longer channel lengths. For purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths of greater than about 5 mm (0.20 inch) upwards of 127 mm (5 inches). The term "channel length" is taken as the distance along a pore or channel measured from an inlet on one side to an outlet on another side. In the case of the mesh of this invention, the channel length refers to the ultra-short distance from an inlet on one side of the mesh to an outlet on the other side of the mesh, which is distinguished from and not to be confused with the overall length through the catalytic substrate, for example, from an inlet at the inner diameter of the coiled mesh to an outlet at the outer diameter of the coiled mesh. In another embodiment, the channel length is not longer than the diameter of the elements from which the substrate is constructed; thus, the channel length may be in a range from 25 μm (0.001 inch) up to about 100 μm (0.004 inch), and preferably not more than about 350 μm (0.014 inch). In view of this so-called "ultra-short channel length", the contact time of reactants with the mesh advantageously ranges from about 5 milliseconds (5 msec) to about 350 msec. The Microlith® brand ultra-short-channel-length catalyst substrate typically comprises from about 100 to about 1,000 or more flow channels per square centimeter. Microlith® brand catalyst substrates may be in the form of woven wire screens, pressed metal screens; or they may be manufactured by perforation and expansion of a thin metal sheet as disclosed in U.S. Pat. No. 6,156,444, incorporated herein by reference.

The Microlith brand ultra-short-channel-length metal mesh substrate facilitates packing more active surface area into a smaller volume and provides increased reactive area and lower pressure drop, as compared with prior art monolithic substrates. Whereas in prior art honeycomb monoliths having conventional long channels where a fully developed boundary layer is present over a considerable length of the channels; in contrast, the ultra-short-channel-length characteristic of the metal mesh substrate avoids boundary layer buildup. Since heat and mass transfer coefficients depend on boundary layer thickness, avoiding boundary layer buildup enhances transport properties. The advantages of employing the ultra-short-channel-length metal substrate, such as the Microlith® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference. Among other advantages, the preferred Microlith® brand ultra-short-channel-length substrate provides for light-weight portable size, a low pressure drop, a high throughput, a high yield of hydrogen-containing reformate, a low yield of coke and coke precursors, and an acceptably long catalyst lifetime, as compared with alternative substrates, such as monoliths.

The substrate in the catalytic reaction zone of the reformer module supports a reforming catalyst capable of facilitating partial oxidation reactions, wherein a hydrocarbon fuel is reformed to partially-oxidized products, namely syngas components of hydrogen and carbon monoxide. A suitable reforming catalyst comprises one or more of the metals of Group VIII of the Periodic Table of the Elements. The Group VIII elements include iron, cobalt, nickel, ruthenium, rhodium, palladium, osmium, iridium, platinum, and mixtures thereof. The deposition of the Group VIII metal(s) onto the substrate can be implemented by methods well known in the art. Alternatively, finished catalysts comprising Group VIII metal(s) deposited and bound to the Microlith® brand ultra-short-channel-length metal mesh substrate are available from Precision Combustion, Inc., North Haven, Conn.

The substrate and reforming catalyst are warmed up using a commercial ignition device, for example, a resistive glow plug heating element, disposed near the substrate. The fuel and oxidizer fed to the reformer are likewise warmed up. The ignition device is energized until temperature sensors, such as thermocouples, located within the reformer module indicate a temperature has been reached sufficient to initiate catalytic activity. Once the catalyst is ignited, the glow plug is de-energized, and energy from the resulting exothermic reaction sustains catalytic operation without a need for inputting external heat. The reformer ignition system of this invention allows for start-up from cold or ambient fuel conditions advan-tageously without a need for a fuel vaporizer or other external source of heat.

The reforming process operates at a temperature greater than about 700° C. and less than about 1,100° C. For purposes of this invention, the operating pressure ranges from about 1 psig or less, for example, from about 0.5 psig (3.5 kPa) to about 1 psig (6.9 kPa). The combined flow of distillate fuel and oxidizer into the reformer is provided to produce an acceptable conversion of fuel to syngas. A suitable gas hourly space velocity ranges from about 10,000 liters of combined fuel and oxidizer per liter of catalyst bed per hour (10,000 $hr^{-1}$) to about 100,000 $hr^{-1}$.

In the apparatus of this invention, there is no necessity to provide a bank of storage vessels to store reformate until called for by the engine. Instead, reformate is produced on demand and fed as-needed directly into the engine or, alternatively, fed through a heat exchange module and/or bypass valve and thereafter into the engine.

In one embodiment, a heat exchange module is disposed between the reformer module and the internal combustion engine. Designs for heat exchange modules (heat exchangers) are found in the art. Generally, the heat exchange module comprises (i) a first inlet communicating with the outlet line receiving the gaseous reformate from the fuel reformer module, and further communicating with a first flow path within the heat exchange module, which passes the reformate and exits it at a first outlet. The heat exchange module further comprises (ii) a second inlet that receives an intake of heat transfer fluid, a second flow path through the heat exchange module, which passes the heat transfer fluid and exits it at a second outlet. The first and second heat exchange paths are (iii) disposed in thermal conductive contact such that heat from the hot reformate in the first flow path is transferred via conduction into the heat transfer fluid passing through the second flow path thereby resulting in a cooled reformate and a heated heat transfer fluid.

Gaseous reformate passing through the heat exchanger is cooled therein for the purpose of increasing volumetric density of the fuel fed to the internal combustion engine. Partially gasified fuel has a potential to reduce to liquid form, which can block the flow stream or boil off and cause material buildup in undesirable locations throughout the system. The heat exchange module can be positioned in any orientation (vertical, horizontal, or any angle in between), provided that little or no condensate accumulates disadvantageously in the system.

The heat transfer fluid comprises any liquid or gaseous fluid capable of accepting heat conductively and essentially without degradation or decomposition. In one instance, the heat transfer fluid comprises ambient air; and heated air is exhausted through the second path outlet into the environment. In this embodiment, the heat exchange module can be provided in the form of a muffin fan that blows ambient air over conduits or tubes of the first flow path, which carry the hot gaseous reformate. In another instance, the heat transfer fluid comprises ambient air; and the heat-exchanged air is collected as a pre-heated oxidizer and fed into the oxidizer inlet of the reformer. In this latter embodiment, the second heat exchange outlet is coupled to the oxidizer inlet of the reformer. From an operative perspective, if a heat exchange module is employed, it is desirable to reduce the temperature of the reformate from its temperature leaving the reformer to a temperature ranging from about 40° C. to about 150° C.

In another embodiment a bypass valve is disposed between the reformer module (after the heat exchange module if any) and the internal combustion engine. The bypass valve comprises: (i) a bypass inlet fluidly coupled to the outlet of the reformer module (or the outlet of the heat exchange module if any); (ii) a bypass first outlet to the environment; and (iii) a bypass second outlet fluidly coupled to the internal combustion engine. Bypass valves can be obtained commercially. The reformate exiting the reformer module and optionally exiting the heat exchange module enters into the bypass valve via the bypass inlet. Thereafter, the reformate exits the bypass valve through either the first bypass outlet to the environment or through the second bypass outlet into the internal combustion engine.

In another embodiment a throttle body is disposed after the reformer module (or after the heat exchange module or bypass valve, as the case may be) and upstream of the intake to the internal combustion engine. The throttle body functions to regulate and adjust the flows of reformate, oxidizer, and liquid co-fuel fed into the combustion engine according to engine torque and speed demands. The throttle body is configured to contain a throttle valve disposed within a housing. On an upstream side of the throttle valve is configured an inlet for oxidizer, such as air, and a separate inlet for gaseous reformate. On a downstream side of the throttle valve is provided an outlet for exiting a mixture of reformate and oxidizer to the intake of the internal combustion engine. Liquid co-fuel is introduced on the downstream side of the throttle valve via a port adapted with a fuel nozzle. Liquid co-fuel is pumped through the nozzle at a rate prescribed by the control module. Co-fuel is preferably injected in pulses. The co-fuel functions to boost the power output of the engine without sacrificing combustion stability.

Notably, the throttle body employed in this invention is not configured like a conventional carburetor, because in this invention the throttle body does not carburete liquid fuel. Thus as employed herein, the throttle body avoids a design, e.g., a venturi, that sucks liquid fuel into an air stream. Rather, the throttle body as used herein employs a conventional nozzle to spray liquid co-fuel into the mixture of gaseous reformate and oxidizer.

The internal combustion engine comprises any conventional spark-ignited internal combustion engine designed to operate on liquid fuel having an octane number greater than 80. Suitable examples of such engines include conventional SI motive engines suitable for small engine applications, such as a lawn mower, or suitable for a transport vehicle, such as an automobile, boat, or motorcycle. Alternatively, the conventional SI internal combustion engine employable in this invention is coupled to an electrical generator, as known in the art. In any of these embodiments the internal combustion engine comprises an intake manifold for introducing a mixture of fuel and oxidizer to one or more combustion chambers, each chamber comprising a reciprocating piston designed for operation on a high octane fuel having an octane number greater than 80, a spark igniter disposed therein as known in the art, and an outlet for exhausting combustion products from each combustion chamber. A liquid fuel inlet is generally present, but may or may not be engaged as desired. For this invention, the fuel intake of each combustion chamber is fluidly connected to an outlet line from the immediate upstream component, such as the reformer module, or the heat exchanger, or the bypass valve as the case may be. In this regard as noted previously, the internal combustion engine may further comprise a throttle body disposed downstream of the reformer module (or after the heat exchange module or bypass valve, as the case may be) and upstream of the reciprocating piston(s). The throttle body functions to regulate and adjust the flows of reformate and oxidizer fed into the combustion engine in accordance with load. Typically, the SI engine comprises from one (1) to six (6) reciprocating pistons. In the present invention, the liquid fuel line may be disconnected from the fuel intake of the IC engine and reconnected to the fuel inlet of the reformer module. Alternatively, the liquid fuel line can be connected to the throttle body disclosed herein; while an additional line can be connected from the fuel tank to the reformer module.

According to this invention, in one embodiment, the SI internal combustion engine is solely fed reformate derived from the low octane distillate fuel. In another embodiment, the SI internal combustion engine is fed a mixture of reformate derived from the low octane distillate fuel supplemented with a co-fuel of low octane liquid distillate fuel. As a consequence, the invention converts a spark-ignited internal combustion engine to operate on logistics fuels, which are readily transported to and ubiquitous to logistics and field operations. Gasoline and other more volatile high octane fuels are not required and need not be provided. Moreover, the catalytic mesh or foam substrate employed in this invention provides for a light-weight, portable reformer module producing a selective reformate with little or no coking. The invention avoids the use of reformers employing heavy particulate catalyst beds and the use of diesel engines characterized by heavy thick walls and sooty emissions.

The system control module monitors and regulates multifunctional and integrated operation of the apparatus. The system control module comprises (i) a supplementary power source; (ii) a data acquisition module; and (iii) a processing module. The power source primarily comprises a battery pack for start-up, peaking, and stabilization of the engine. The size of the battery pack is determined by the scale and output of the engine, as determined by the skilled person. As expected, the battery pack can be obtained commercially. The data acquisition module comprises commercially-available chemical sensors including oxygen and hydrocarbon sensors, temperature sensors (e.g., thermocouples), mass flow controllers, and pressure sensors, including a manifold absolute pressure (MAP) sensor (e.g., Freescale Semiconductor, Inc.) for monitoring the pressure of the combined flows of reformate and oxidizer into the engine. All of the aforementioned sensors intermittently or continuously monitor inputs and outputs and engine demands. The processing module receives the acquired data from the acquisition module and manipulates the data through a system of computerized hardware and software, thereby feeding back commands to the distillate fuel and oxidizer intakes to the reformer. The oxidizer feed to the reformer module is typically calculated on the quantity of distillate fuel fed to the reformer and the desired reforming temperature.

Additionally, the system control module is constructed to control bypass valve switching between the bypass first outlet to the environment and the bypass second outlet to the internal combustion engine. Specifically, if the internal combustion engine is not operational during reformer operation, the control module automatically opens the bypass valve first outlet to the environment and closes the bypass valve second outlet to the internal combustion engine. In contrast, when the reformer and the internal combustion engine are both operational, the control module automatically closes the bypass valve first outlet to the environment and opens the bypass valve second outlet to the internal combustion engine.

In this invention, a spark-ignited internal combustion engine designed to operate on high octane fuel of greater than 80 octane rating is retrofitted with the fuel reformer module, and preferable heat exchange module, bypass valve, and/or throttle body disclosed herein; and the resulting apparatus of this invention operates on high octane gaseous reformate with or without a quantity of low octane distillate co-fuel. When no distillate co-fuel is fed to the engine, the SI-IC engine operates on 100 percent high octane reformate derived from low octane distillate fuel fed to the reformer. When distillate co-fuel is supplemented to the engine, the SI-IC engine operates on high octane reformate in a range from about 20 percent to less than 100 percent and on low octane co-fuel in a range from greater than 0 to about 80 percent, based on the total fuel input to the engine. Accordingly, a conventional SI internal combustion engine, designed for operation on gasoline, can be easily retrofitted as described herein and operated solely (100 percent) on gaseous reformate derived from diesel or any other low octane distillate, biomass, or synthetic fuel; or alternatively, the gasoline engine can be operated on a combination of 20-100 percent diesel reformate and 0-80 percent liquid diesel (or other distillate fuel). Thus, this invention advantageously allows for conventional gasoline-fueled vehicles and generators to be operated on logistically-preferred distillate fuels or other distillate fuel indigenous to a geographic locale. The system provides for generators having a power output ranging, for example, from 0.3 to 3.0 kWe.

The skilled person should understand that the reformer module operates continuously and takes up to about 1 minute to reach steady state. In contrast, the internal combustion engine starts up immediately, but each piston undergoes combustion intermittently. Thus, a problem arises in smoothly interfacing start-up of the reformer module with start-up of the internal combustion engine. In one embodiment wherein the invention technology is employed in a small scale portable generator, the internal combustion engine is typically hand-cranked. In such instance, the reformate bypass valve is employed to vent reformate to the environment until such time as the engine is cranking sufficiently fast to draw sufficient air into the combustion chamber with reformate. At such time, the bypass valve can be switched from venting to the environment to venting to the internal combustion engine. On the other hand, when the internal combustion engine is started-up electronically via the battery pack, reformate can be immediately flowed into the combustion chamber with sufficient air. In this instance, the bypass valve is likely to be unnecessary.

In accordance with this invention, a start-up procedure using the bypass valve comprises the following steps: (1) powering the ignition source within the reformer; (2) starting the flow of distillate fuel to the reformer; (3) simultaneously or prior to step (2), opening the bypass first outlet to the environment and closing the bypass second outlet to the internal combustion engine; (4) starting the flow of oxidizer to the reformer; (5) igniting the partial oxidation of the fuel and oxidizer in the reformer to form gaseous reformate; (7) exiting gaseous reformate from the reformer and passing same through the heat exchange module and through the bypass first outlet to the environment; (8) cranking the internal combustion engine; (9) opening the bypass second outlet to the internal combustion engine and closing the bypass first outlet to the environment; (10) passing the gaseous reformate into the internal combustion engine with oxidizer for combustion. An additional step comprises (11) depowering the ignition source to the reformer after reforming reaches steady state.

As used herein, the term "inlet" refers to any conventional structure that provides for passage of a liquid or gaseous fluid into a component of the apparatus invention disclosed hereinabove, such structure to include any auxiliary part(s) as known to a person skilled in the art. As used herein, the term "outlet" refers to any conventional structure that provides for passage of a liquid or gaseous fluid out of a component of the apparatus invention disclosed hereinabove, such structure to include any auxiliary part(s) as known to a person skilled in the art.

EMBODIMENTS

Example 1 (E-1)

A commercial generator (Honda Model No. EU1000i; 900We output using gasoline; 50 cc displacement), configured with a spark-ignited, single piston internal combustion engine designed for operation on gasoline, was modified in accordance with this invention as illustrated in FIG. 1 so as to operate on a reformate derived from JP-8 fuel. A reformer module 2 was provided comprising a fuel inlet 3 consisting of an electromagnetic fuel injector for feeding a partially-atomized liquid distillate fuel to a mixing zone 4; an oxidizer inlet 5 for feeding an air supply from a forced air blower to the mixing zone 4; mixing zone 4 for thoroughly atomizing the liquid fuel and mixing it with the air; and a catalytic reforming zone 6 for receiving the mixture of liquid fuel and air from the mixer 4 and partially oxidizing the mixture to yield a syngas reformate ($CO+H_2$). The catalytic reforming zone 6 comprised an ultra-short-channel-length substrate in the form of a coiled reticulated metal mesh having an inner diameter and an outer diameter and a radial flow path from the inner to the outer diameters, the mesh having a rhodium-based catalyst supported thereon (Precision Combustion, Inc., North Haven, Conn.). An ignition source 7 in the form of a glow plug was positioned within the inner diameter of the coiled metal mesh for initiating the partial oxidation reaction. An exhaust line 8 fluidly coupled to the catalytic reaction zone 6 exhausted the partial oxidation products, CO and $H_2$.

The reformate exiting line 8 was fed via a first inlet 9 into a heat exchange module 11, where it passed through a first flow path (arrows) and exited via first outlet 12. Ambient air was blown as a heat transfer fluid via second inlet 13 in the heat exchange module 11, passing through a second flow path in thermal conductive contact with the first flow path and exiting at second outlet 14 to the environment. A cooled reformate leaving outlet 9 was fed into bypass valve 16 comprising first outlet 17 to the environment and second outlet 18 coupled to throttle body 19. Air entered throttle body 19 via inlet 20. A mixture of gaseous reformate and air exiting throttle body 19 was passed into the combustion chamber of internal combustion engine 1 through reformate-oxidizer intake 27, where it was ignited via spark plug 26 and combusted. Combustion products exhausted via outlet 24. Liquid co-fuel inlet 23 was not engaged. Mechanical energy obtained from combustion engine 1 was converted in generator 21 and made available via a variable resistor. System control module 25 comprising a battery pack, data acquisition module, and processing module provided integrated operation and control of the apparatus.

In this embodiment, IC engine 1 was hand-cranked. Reformer module 2 was fed liquid JP-8 fuel and air, which was converted to syngas reformate ($H_2$+CO) and initially vented via bypass outlet 17 to the environment. Once engine 1 was turning over well enough to suck in sufficient air through air intake 20, the bypass valve was opened at outlet 18 and closed at outlet 17, allowing the reformate to pass into the engine for combustion. FIG. 2 provides a graph of input, process conditions, and output associated with start-up over an initial 140 seconds. This generator system, including the reformer, operated for over 200 hours producing up to 800We output. When the reformate to the IC engine was supplemented with liquid JP-8 fuel fed through the fuel intake of the engine, up to 1 kWe power output was obtained.

The example shows that a SI internal combustion engine designed for high octane gasoline fuel can be modified in accordance with the invention to operate for a substantial time solely on reformate derived from low octane distillate fuel, or on reformate supplemented with the low octane distillate fuel. Similar design modifications in accordance with the invention have been applied to SI internal combustion engines ranging in size from 35 to 200 cc displacement, such as a Honda Motor Company 3 kWe generator (Honda EU3000i), to accommodate lower or higher power output as desired.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A spark-ignited internal combustion engine adapted for multi-fuel operation, comprising:
   (a) a reformer module comprising:
      (i) a fuel inlet,
      (ii) an oxidizer inlet,
      (iii) a mixing zone fluidly coupled to the fuel inlet and oxidizer inlet,
      (iv) a catalytic reaction zone fluidly coupled to the mixing zone, the reaction zone comprising a mesh or foam substrate having an ultra-short-channel-length, the substrate having supported thereon a reforming catalyst;
      (v) an ignition source disposed within the catalytic reaction zone; and
      (vi) an outlet line fluidly coupled to the catalytic reaction zone; and
   (b) an internal combustion engine comprising:
      (i) one or more combustion chambers, each combustion chamber comprising a reciprocating piston and a spark igniter;
      (ii) a reformate intake fluidly coupled to the outlet line of the reformer module and further fluidly coupled to each combustion chamber;
      (iii) an oxidizer intake fluidly coupled to each combustion chamber; and
      (iv) an exhaust outlet from each combustion chamber, wherein a heat exchange module is disposed between the reformer module and the internal combustion engine, wherein the heat exchange module comprises (i) a first heat exchange inlet fluidly coupled to the outlet of the reformer module, a first flow path through the heat exchange module from the first heat exchange inlet to a first heat exchange outlet, wherein the first heat exchange outlet is fluidly coupled to the reformate intake of the internal combustion engine; (ii) a second heat exchange inlet for inputting a heat transfer fluid, a second flow path through the heat exchange module from the second heat exchange inlet to a second heat exchange outlet; and (iii) the first and second flow paths being in thermally conductive contact.

2. The internal combustion engine of claim 1 wherein the mesh or foam substrate has an ultra-short-channel-length ranging from 25 microns to 500 microns.

3. The internal combustion engine of claim 2 wherein the mesh or foam substrate comprises a metal mesh or metal foam selected from nickel-chrome-iron alloys.

4. The internal combustion engine of claim 2 wherein the substrate supports a reforming catalyst selected from one or more Group VIII elements of the Periodic Table.

5. The internal combustion engine of claim 1 further comprising a system control module coupled to the reformer module and the internal combustion engine, the system control module configured with (i) a supplementary power source; (ii) a data acquisition module; and (iii) a processing module.

6. The internal combustion engine of claim 1 further comprising an electrical conversion module coupled to the internal combustion engine and configured to convert mechanical output of the internal combustion engine into electricity.

7. The internal combustion engine of claim 1 wherein the exhaust outlet of the internal combustion engine is fluidly coupled to the fuel inlet of the reformer module.

8. A spark-ignited internal combustion engine adapted for multi-fuel operation comprising:
   (a) a reformer module comprising:
      (i) a fuel inlet;
      (ii) an oxidizer inlet,
      (iii) a mixing zone fluidly coupled to the fuel inlet and the oxidizer inlet,
      (iv) a catalytic reaction zone fluidly coupled to the mixing zone, the reaction zone comprising a mesh or foam substrate having an ultra-short-channel-length, the substrate having supported thereon a reforming catalyst;
      (v) an ignition source disposed within the catalytic reaction zone; and
      (vi) an outlet line fluidly coupled to the catalytic reaction zone;
   (b) a throttle body comprising:

(i) a housing having a throttle valve disposed therein;
(ii) upstream of the throttle valve, a reformate intake fluidly coupled to the outlet line (a)(vi) of the reformer module;
(iii) upstream of the throttle valve, an oxidizer intake; and
(iv) downstream of the throttle valve, an outlet for exiting a mixture of reformate and oxidizer; and
(c) an internal combustion engine comprising:
(i) one or more combustion chambers, each combustion chamber comprising a reciprocating piston and a spark igniter;
(ii) a reformate-oxidizer intake fluidly coupled to the outlet (b)(iv) of the throttle body and fluidly coupled to each combustion chamber; and
(iii) an exhaust outlet from each combustion chamber, wherein a heat exchange module is disposed between the reformer module and the internal combustion engine, wherein the heat exchange module comprises (i) a first heat exchange inlet fluidly coupled to the outlet of the reformer module, a first flow path through the heat exchange module from the first heat exchange inlet to a first heat exchange outlet, wherein the first heat exchange outlet is fluidly coupled to the reformate-oxidizer intake of the internal combustion engine; (ii) a second heat exchange inlet for inputting a heat transfer fluid, a second flow path through the heat exchange module from the second heat exchange inlet to a second heat exchange outlet; and (iii) the first and second flow paths being in thermally conductive contact.

9. The internal combustion engine of claim 8 wherein the mesh or foam substrate has an ultra-short-channel-length ranging from 25 microns to 500 microns.

10. The internal combustion engine of claim 8 further comprising (d) a system control module operatively coupled to the reformer module and the spark-ignited internal combustion engine, wherein the system control module is configured with (i) a supplementary power source; (ii) a data acquisition module; and (iii) a processing module.

11. The internal combustion engine of claim 8 further comprising an electrical conversion module coupled to the internal combustion engine and configured to convert mechanical output of the internal combustion engine into electricity.

12. A spark-ignited internal combustion engine adapted for multi-fuel operation comprising:
(a) a reformer module comprising:
(i) a fuel inlet;
(ii) an oxidizer inlet,
(iii) a mixing zone fluidly coupled to the fuel inlet and the oxidizer inlet,
(iv) a catalytic reaction zone fluidly coupled to the mixing zone, the reaction zone comprising a mesh or foam substrate having an ultra-short-channel-length, the substrate having supported thereon a reforming catalyst;
(v) an ignition source disposed within the catalytic reaction zone; and
(vi) an outlet line fluidly coupled to the catalytic reaction zone;
(b) a heat exchange module comprising
(i) a first heat exchange inlet fluidly coupled to the outlet line of the reformer module, and a first flow path through the heat exchange module from the first heat exchange inlet to a first heat exchange outlet;
(ii) a second heat exchange inlet, and a second flow path through the heat exchange module from the second heat exchange inlet to a second heat exchange outlet; and
(iii) the first flow path being in thermally conductive contact with the second flow path;
(c) a bypass valve comprising:
(i) a bypass inlet fluidly coupled to the first outlet of the heat exchange module;
(ii) a bypass first outlet to the environment; and
(iii) a bypass second outlet;
(d) a throttle body comprising:
(i) a housing having a throttle valve disposed therein;
(ii) upstream of the throttle valve, a reformate intake fluidly coupled to the bypass second outlet;
(iii) upstream of the throttle valve, an oxidizer intake; and
(iv) downstream of the throttle valve, an outlet for exiting a mixture of reformate and oxidizer; and
(e) an internal combustion engine comprising:
(i) one or more combustion chambers, each combustion chamber comprising a reciprocating piston and a spark igniter;
(ii) a reformate-oxidizer intake coupled to the outlet (d)(iv) of the throttle body and coupled to each combustion chamber; and
(iii) an exhaust outlet from each combustion chamber; and
(f) a system control module operatively coupled to the reformer module, the heat exchange module, the bypass valve, and the spark-ignited internal combustion engine, the system control module being configured with (i) a supplementary power source; (ii) a data acquisition module; and (iii) a processing module.

13. The internal combustion engine of claim 12 wherein the mesh or foam substrate has an ultra-short-channel-length ranging from 25 microns to 500 microns.

14. The internal combustion engine of claim 12 further comprising an electrical conversion module coupled to the internal combustion engine and configured to convert mechanical output of the internal combustion engine into electricity.

15. The internal combustion engine of claim 14 producing from 0.3 to 3.0 kWe output.

16. A method for starting up the spark-ignited internal combustion engine of claim 12, comprising:
(a) powering the ignition source within the reformer;
(b) starting a flow of low octane distillate fuel to the reformer;
(c) prior to step (b) or simultaneously with step (b), opening the bypass first outlet to the environment and closing the bypass second outlet to the internal combustion engine;
(d) starting a flow of oxidizer to the reformer;
(e) igniting the partial oxidation reaction of the fuel with the oxidizer in the reformer to form a gaseous reformate comprising hydrogen and carbon monoxide;
(f) exiting the gaseous reformate from the reformer and passing same through the heat exchanger and through the bypass first outlet to the environment;
(g) cranking or energizing the spark-ignited internal combustion engine;
(h) opening the bypass second outlet to the spark-ignited internal combustion engine and closing the bypass first outlet to the environment;
(i) passing the gaseous reformate into the spark-ignited internal combustion engine with an additional flow of oxidizer for combustion.

* * * * *